March 10, 1931. W. G. KING 1,795,866
FACE SHIELD
Filed July 2, 1928
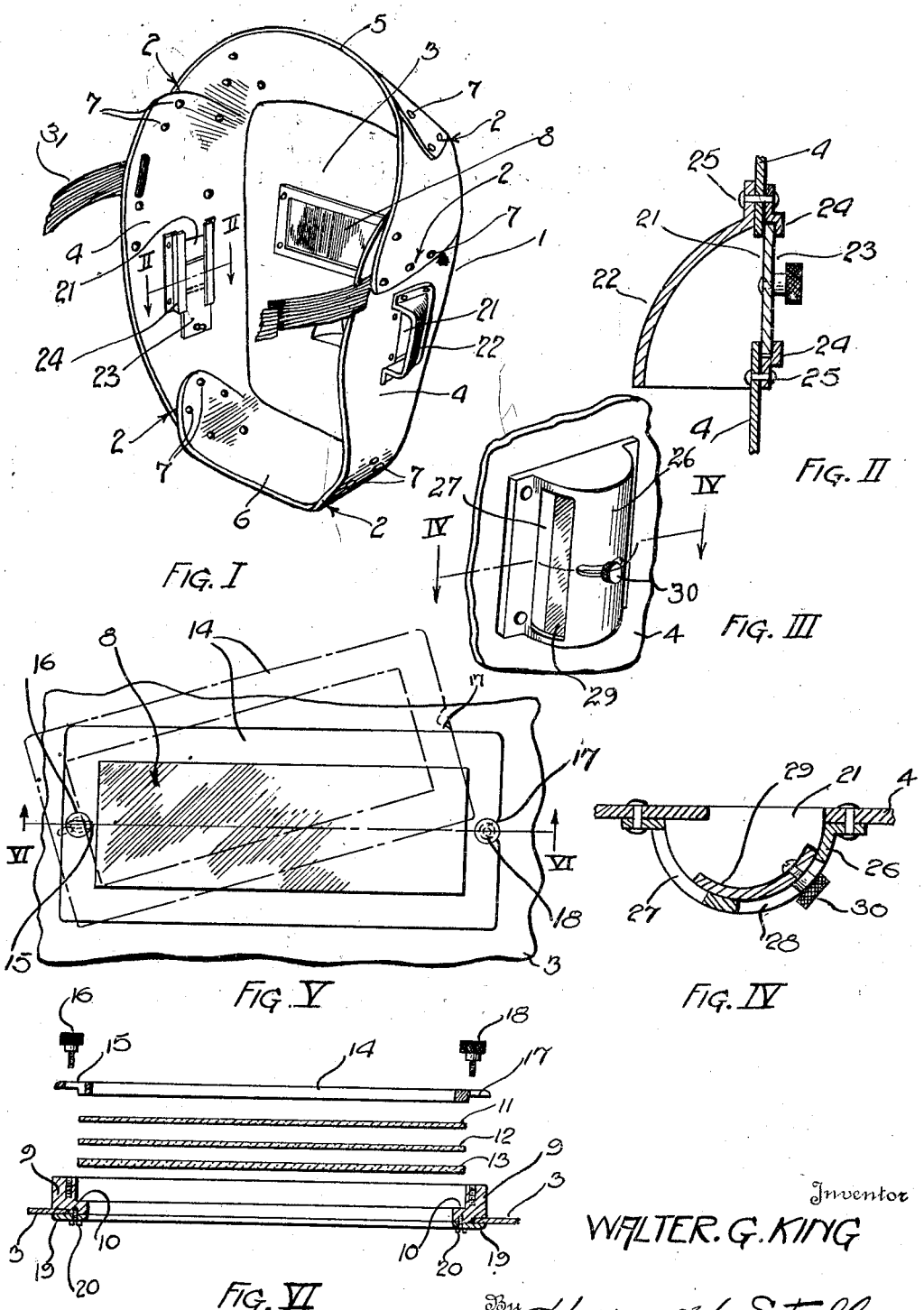
Inventor
WALTER. G. KING
By Harry H. Styll
Attorney Patented Mar. 10, 1931

1,795,866

UNITED STATES PATENT OFFICE

WALTER G. KING, OF NEW YORK, N. Y., ASSIGNOR TO AMERICAN OPTICAL COMPANY, OF SOUTHBRIDGE, MASSACHUSETTS, A VOLUNTARY ASSOCIATION OF MASSACHUSETTS

FACE SHIELD

Application filed July 2, 1928. Serial No. 290,007.

This invention relates to improvements in face shields and has particular reference to new and improved means of illumination and ventilation therefor.

The principal object of the invention is to provide new and improved light and air regulating means for a face shield.

Another object of the invention is to provide improved lens holding means wherein lenses may be quickly inserted or removed from the face shield.

Another object of the invention is to provide improved adjustable ventilating means for controlling the amount of ventilation.

Another object of the invention is to provide improved ventilating means through which no injurious light or flying particles may reach the eyes of the wearer.

Another object of the invention is to provide simple, efficient and economical means of illuminating and ventilating face shields.

Other objects and advantages of the invention will be apparent from the following description taken in connection with the accompanying drawings and it will be apparent that many changes may be made in the arrangements of parts and details of construction without departing from the spirit of the invention as expressed in the accompanying claims. I, therefore, do not wish to be limited to the exact details and arrangements shown and described as the preferred forms only have been shown by way of illustration.

Referring to the drawings:

Fig. I is a rear perspective view of a face shield embodying the invention;

Fig. II is a fragmentary sectional view on line II—II of Fig. I;

Fig. III is a fragmentary perspective view of a modified form of the invention;

Fig. IV is a sectional view on line IV—IV of Fig. III;

Fig. V is a front view of the lens holding means;

Fig. VI is a sectional view on line VI—VI of Fig. V showing the parts separated.

In many industries workmen are exposed to injurious heat or light rays, to dust or flying particles or missiles against which they must be protected by a shield or mask. These masks provide the necessary protection but are very cumbersome and uncomfortable to the wearer as they completely surround the face and hinder breathing and cause undue perspiration, particularly in cases where the workmen are exposed to intense heat. The flying particles or missiles scratch and blur the lenses to the extent of obstructing the vision of the wearer, or the lenses become broken and the workmen must discontinue work until the lenses have been interchanged or replaced. In many instances the workmen have been overcome by the intense heat and forced to remove their masks and rest during their work. These undesirable features caused much loss of time and expense to the manufacturer and much discomfort and discontent to the workmen.

It is, therefore, the prime object of my invention to provide ventilation means for cooling the face shield and easing the breathing of the wearer, thereby forming a comfortable and more desirable shield. Another great advantage of my invention is that the lenses may be quickly interchanged or replaced when they have been scratched and blurred or broken by flying particles.

Referring to the drawings wherein similar reference characters denote corresponding parts throughout, I form the face shield 1 by taking a piece of sheet material, such as aluminum, fiber board or other non-inflammable material, and cut, bend and overlap the same at various places as indicated at 2 to form the front portion 3, side walls 4 and the upper and lower walls 5 and 6. The overlapping portions 2 are secured together by the rivets or other suitable means 7 and thereby form a rigid shield which when worn by the wearer completely surrounds the face and provides protection from the intense heat of the work, injurious light rays and flying particles such as hot chips, molten metal, etc. The front portion 3 is provided with a suitable window 8 through which the workmen may view the work without danger of injury to his eyes. The window 8 is formed by attaching a frame member 9 within an opening formed in the front portion 3 and is provided with a shoulder 10 on which the lenses 11, 12 and 13 are seated.

A suitable lens retaining rim 14 is placed over the lenses and is provided at one end with the slot 15 for the thumb screw 16 and at the opposite end with the notch 17 for the thumb screw 18. The slot 15 and notch 17 provide means whereby the rim may be easily loosened or removed for the interchangement or replacement of lenses. The thumb screws 16 and 18 are threaded into the frame member 9 and are used to secure the lenses 11, 12 and 13 within the frame. The lenses may be removed from the face shield 1 by loosening the thumb screws 16 and 18 and sliding the lens retaining rim 14 sideways until the notch 17 disengages the thumb screw 18.

The rim 14 is then swung about the screw 16 as illustrated by the dot and dash lines in Fig. V and the lenses may then be replaced or interchanged. The frame member 9 is secured to the front portion 3 by the flange 19 and the screws 20.

The eyes of workmen exposed to intense light, such as workmen employed in electric arc welding must be protected against the intense light by using properly colored glass.

The window 8 is, therefore, provided with a colored light retarding lens as indicated at 12. This lens may be any of the well known types of light retarding lenses. In the same way protection may be given to the eyes against injurious invisible light and heat rays by making one of the lenses of a properly prepared invisible light and heat retarding composition such as a metallic coated or similar lens 13. These light and heat retarding lenses are an expensive type of lens and are, therefore, protected from flying particles by the use of an inexpensive cover glass 11. When the cover glass 11 becomes scratched or blurred it may be removed and replaced at a small expense.

The mask or shield is ventilated as shown in Figs. I and II through the openings 21 formed in the side walls 4. The openings 21 are provided exteriorly with the curved vent shields 22 which are sealed on three sides and opened in the rear to prevent injurious light rays or flying particles from reaching the eyes of the wearer.

The openings are also provided internally with the slide plates 23 adjustably mounted in the slideways 24 to increase or decrease the size of the openings 21. The slide plates 23 provide means by which the amount of ventilation may be controlled. The vent shields 22 and slideways 24 are secured in position on the face shield by the rivets or similar means 25.

In Figs. III and IV, I have shown a modified form of vent control in which the opening 21 is covered by the arcuate vent shield 26 formed with a rearward opening 27 and slot 28. A slide plate 29 is positioned within the arcuate vent shield 26 and is held in position and operated by the thumb piece 30. The slide plate 29 is operated by moving the thumb piece 30 longitudinally of the slot 28 to increase or decrease the size of the opening 27. The slide plate 29 provides means for controlling the amount of ventilation and may be adjusted without removing the face shield. Although I have specified that this particular face shield is made of sheet material which is cut and bent it may be formed by pressing the material into the shape desired. The face shield 1 may be supported on the head of the wearer by the head band or similar means 31.

From the foregoing description it will be seen that I have provided simple, efficient and economical means for illuminating and ventilating face shields wherein the amount of ventilation may be controlled and the illuminating means may be quickly interchanged or replaced.

Having described my invention, I claim:

1. A device of the character described comprising a face mask having opposed ventilation openings therein, an arcuate shield over each opening having a longitudinal ventilation aperture and a transverse slot, means movable in the slot and closure means attached to the said movable means to open and close the apertures in the arcuate shield.

2. A device of the character described comprising a face mask having a sight opening therein, a lens frame having a lens seat thereon and a portion fitting around the sight opening and secured to the mask, a lens in the lens seat and a lense holding member over the lens, said lens holding member having a peripheral flange portion formed with a slotted pivot on one side and a notch on the opposite side whereby it may be moved on the slotted pivot to release the notch and then swung on the pivot to release the lens.

3. A device of the character described comprising a face mask having a sight opening therein, a lens frame having a shouldered lens seat thereon and a portion fitting around the sight opening and secured to the mask, a lens in the lens seat and a lens holding member having a portion fitting within the lens seat and over the lens and having a flanged portion overlying the end of the lens seat, said flanged portion having a slotted pivot on one side and a notch on the opposite side whereby it may be moved on the slotted pivot to release the notch and then swung on the pivot to release the lens.

4. A device of the character described comprising a face mask having a ventilation opening therein, an arcuate shield over the opening having a longitudinal ventilation aperture and a transverse slot, means movable in the slot and closure means attached to the said movable means to open and close the aperture in the arcuate shield.

WALTER G. KING.